United States Patent
Ro et al.

(10) Patent No.: US 7,942,099 B2
(45) Date of Patent: May 17, 2011

(54) STATIC BEARING CONVEYING APPARATUS HAVING MAGNETICALLY PRELOADING AND MOTIONAL ERROR CORRECTING FUNCTIONS

(75) Inventors: Seung-kook Ro, Yuseong-gu (KR); Chun-hong Park, Seo-gu (KR)

(73) Assignee: Korea Institute of Machinery & Materials, Daejeon (KR)

( * ) Notice: Subject to any disclaimer, the term of this patent is extended or adjusted under 35 U.S.C. 154(b) by 561 days.

(21) Appl. No.: 11/993,469

(22) PCT Filed: Aug. 23, 2005

(86) PCT No.: PCT/KR2005/002775
§ 371 (c)(1), (2), (4) Date: Dec. 21, 2007

(87) PCT Pub. No.: WO2007/024031
PCT Pub. Date: Mar. 1, 2007

(65) Prior Publication Data
US 2010/0071583 A1    Mar. 25, 2010

(51) Int. Cl.
*B60L 13/06* (2006.01)
(52) U.S. Cl. .................. 104/284; 104/281
(58) Field of Classification Search ........ 104/281–284, 104/290, 292
See application file for complete search history.

(56) References Cited

U.S. PATENT DOCUMENTS

| | | | | |
|---|---|---|---|---|
| 3,797,403 A * | 3/1974 | Schwarzler et al. | ......... | 104/284 |
| 3,834,318 A * | 9/1974 | Fellows et al. | ......... | 104/284 |
| 3,937,148 A * | 2/1976 | Simpson | ......... | 104/283 |
| 4,768,064 A * | 8/1988 | Isohata et al. | ......... | 355/53 |
| 5,067,415 A * | 11/1991 | Morishita et al. | ......... | 104/281 |
| 5,360,470 A * | 11/1994 | Ono et al. | ......... | 104/284 |
| 5,377,596 A * | 1/1995 | Ono et al. | ......... | 104/284 |
| 5,641,054 A * | 6/1997 | Mori et al. | ......... | 198/619 |
| 5,732,636 A * | 3/1998 | Wang et al. | ......... | 104/284 |
| 6,267,876 B1 * | 7/2001 | Allaire et al. | ......... | 310/90.5 |
| 7,472,786 B2 * | 1/2009 | Komori | ......... | 198/619 |
| 2010/0071583 A1 * | 3/2010 | Ro et al. | ......... | 104/284 |

FOREIGN PATENT DOCUMENTS

DE            24 46 851            4/1976

* cited by examiner

*Primary Examiner* — S. Joseph Morano
*Assistant Examiner* — Jason C Smith
(74) *Attorney, Agent, or Firm* — Oblon, Spivak, McClelland, Maier & Neustadt, L.L.P.

(57) ABSTRACT

Disclosed is a static bearing conveying apparatus having magnetically preloading and motional error correcting functions. The apparatus comprises a guide having a guide surface formed on one side of the guide facing a table, magnetic preload units provided between the guide and the table to generate preload, and a motional error correcting control unit comprising a controller to control the magnetic preload units and a power amplifier to apply electric current according to a control signal from the controller. Each of the magnetic preload units comprises a permanent magnet, a core collinear with magnetic fluxes from the permanent magnet, an electromagnetic coil wound around the core, and a fixing bracket having the permanent magnet supported by the table. The apparatus is simplified in structure of the table and the overall guide, and reduces motional errors of the guide by correcting errors of a floating gap of the static bearings.

5 Claims, 5 Drawing Sheets

STATIC BEARING CONVEYING APPARATUS HAVING MAGNETICALLY PRELOADING AND MOTIONAL ERROR CORRECTING FUNCTIONS

BACKGROUND OF THE INVENTION

1. Field of the Invention

The present invention relates to a static bearing conveying apparatus having magnetically preloading and motional error correcting functions. More particularly, the present invention relates to a static bearing conveying apparatus, which comprises a table and a guide having simple construction, and which is adapted to generate preload using magnetic force and to adjust a floating gap through variation in magnetic force applied to generate the preload, thereby providing magnetically preloading and motional error correcting functions.

2. Description of the Related Art

Preload for static bearings is generated by magnetic force of a permanent magnet, and the magnetic force is varied to maintain a floating gap of the static bearings by use of an electromagnetic coil. This construction is based on the fact that the rigidity of the static bearings based on the preload is inversely proportional to the floating gap.

Specifically, the floating gap required for the static bearings can be adjusted by changing the intensity of magnetic force through change of electric current applied to the electromagnetic coil, and errors in angular motion and in linear motion horizontal to a conveying direction of a conveying system can be corrected according to structure of a correcting unit.

In FIG. 1, a conventional conveying system employing static bearings is shown. As an example of the conventional conveying system, a double-sided pad type conveying apparatus comprises a guide 20 located below a table 10 to maintain sufficient rigidity of the static bearings and having guide surfaces 21 and formed on opposite sides thereof to guide the static bearings, and a pair of bearing pads 30 fixed in parallel to each other on the table 10 while facing the guide surfaces 21 and 22.

Thus, machining errors on the guide surfaces 21 and 22 requiring precise machining directly affect motional errors in conveyance, which causes motional precision of the table to be lowered.

In addition, since the guide surfaces 21 and 22 must be identically formed on both sides of the guide, machining costs are increased, and since the conventional conveying system requires the pair of pads 3a and 3b, manufacturing costs thereof are also increased.

SUMMARY OF THE INVENTION

Therefore, the present invention has been made in view of the above problems, and it is an object of the present invention to provide a static bearing conveying apparatus, which can be simplified in structure by applying a magnetic preloading device to a conveying system employing static bearings, while correcting motional error via active control of magnetic force.

In accordance with an aspect of the present invention, the above and other objects can be accomplished by the provision of a static bearing conveying apparatus employing static bearings and having magnetic preloading and motional error correcting functions, the apparatus comprising: a guide having a guide surface formed on one side facing a table; magnetic preload units provided between the guide and the table to generate preload; and a motional error correcting control unit comprising a controller to control the magnetic preload units, and a power amplifier to apply electric current according to a control signal from the controller.

Each of the magnetic preload units may comprise a permanent magnet, a core collinear with magnetic fluxes from the permanent magnet, and an electromagnetic coil wound around the core, and located between static bearing pads and the guide to generate the preload, so that a floating gap for the static bearings can be corrected by changing magnetic force generating the preload, and errors in angular motion and linear motion in a direction horizontal to a conveying direction of a conveying system can be corrected according to structure of a correcting apparatus.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Embodiments of the present invention will be described with reference to the drawings as follows.

Figure 1:
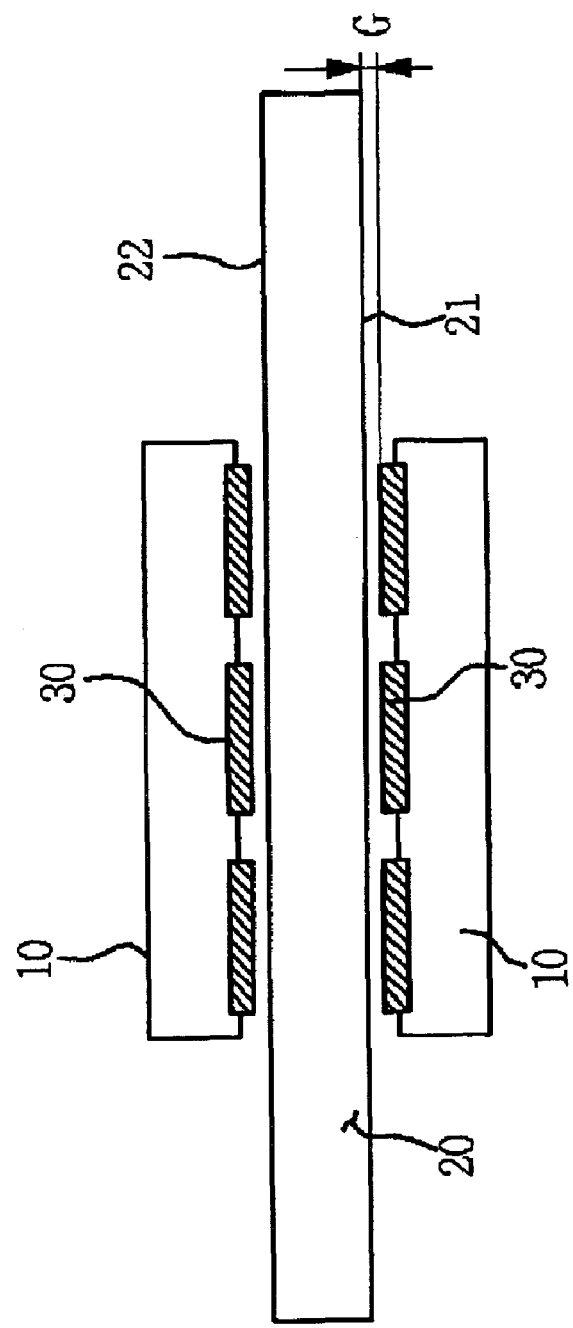
FIG. 1 is a cross-sectional view illustrating the construction of a conventional double-sided pad type static bearing conveying apparatus.
Figure 2:
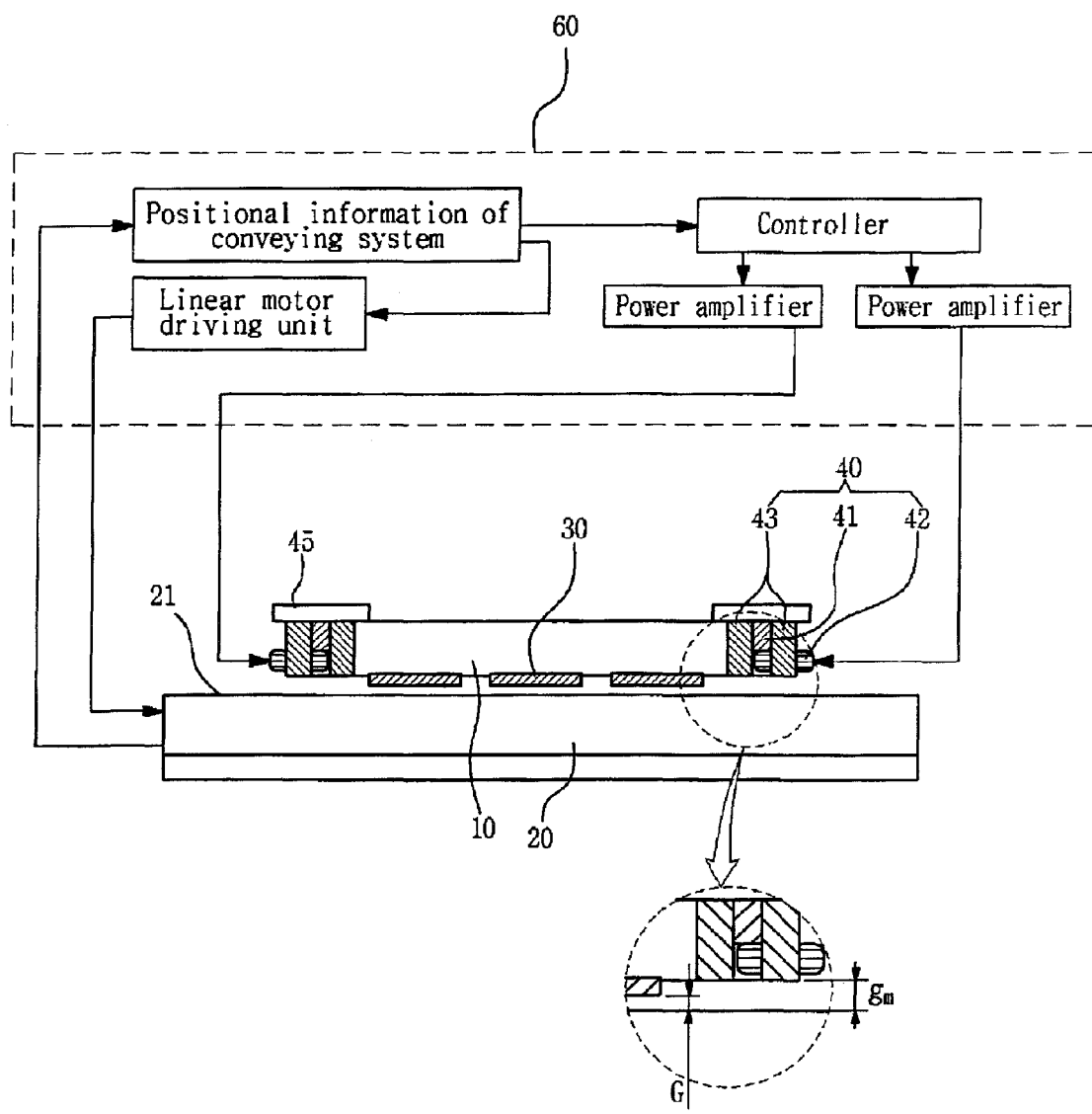
FIG. 2 is a cross-sectional view illustrating a single-sided pad type static bearing conveying apparatus having preloading and motional error correcting functions according to the present invention.

FIG. 2 is a cross-sectional view illustrating a single-sided pad type static bearing conveying apparatus having preloading and motional error correcting functions according to the present invention. According to the present invention, the static bearing apparatus comprises a guide 20 having a guide surface 21 formed on one side of the guide 20 which guides a table 10, a plurality of static bearing pads 30 fixed to the table 10 so as to face the guide face 21, and magnetic preload units 40 equipped to the table 10 to generate preload by virtue of magnetic force and to control a floating gap of the static bearings by changing the magnetic force serving to generate the preload.

The magnetic preload units 40 are equipped to both sides of the table 10 to generate the preload, which can act as attracting force between the table 10 and the guide 20 to equilibrate the floating gap required for the static bearings with floating force of the static bearings.

Each of the magnetic preload units 40 comprises a permanent magnet 41 to generate magnetic preload, a core 43 having the permanent magnet 41 fixed thereto and collinear with magnetic fluxes from the permanent magnet 41, and an electromagnetic coil 42 wound around the core 43. The permanent magnet 41 is supported by a fixing bracket 45 supported on the table 10.

In addition, each of the magnetic preload units 40 is adapted to control the intensity of magnetic force according to magnetic fluxes generated from the permanent magnet 41 and to a direction of electric current applied to the electromagnetic coil 42, i.e. to control a gap G between the static bearing pads 30 and the guide 20 via variation in intensity of electric current of the electromagnetic coil 42.

The magnetic preload unit 40 is preferably designed using variables including a material and a size of the permanent magnet 41, a cross-sectional area of the core 43, and a gap between the core 43 and the guide surface 21 so as to match a required preloading force.

The gap G between the static bearing pads 30 equipped to the table 10 and the guide 20 must be maintained at a distance of 10 μm, and the gap between the core 43 of the magnetic preload unit 40 and the guide 20 must be maintained at a distance of about 500~2,000 μm.

The static bearing conveying apparatus of the present invention is adapted to be linearly moved by an actuator which comprises a discrete linear motor 50, a ball-screw or a voice electromagnetic coil to cause linear motion of an object, and comprises a conveying unit, which includes a conveying actuator and a feedback sensor or includes a linear scale and a laser feedback device to control a conveying location.

The magnetic preload units 40 are connected to a motional error correcting control unit 60 which comprises a controller to control the magnetic preload unit 40, and a power amplifier to apply electric current to the magnetic preload unit 40. The controller comprises a digital controller (DSP board or PC), and calculates the motional error of the conveying system based on information about locations and errors of the conveying system.

An additional correction signal for compensating the motional error is converted into an associated electric current, which is applied to the electromagnetic coil of the magnetic preload unit 40.

With the construction as described above, the magnetic preload units 40 can arbitrarily correct the floating gap G (μm) of the static bearings between the static bearing pads 30 and the guide 20, and the gap gm (mm) between the magnetic preload unit 40 and the guide 20 by changing magnetic force of the permanent magnet 41 applied to generate preload through change of electric current applied to the electromagnetic coil 42.

Correction and control of the floating gap G by virtue of the magnetic preload can be used as a means for correcting errors in linear motion which is horizontal to the conveying direction, and is caused by a machining error on the guide surface 21 upon linear motion of the table 10 in the conveying direction.

According to the present invention, since the guide surface 21 for guiding the static bearing pad 30 is formed only on one side of the guide 20, only one-side precise machining is required for forming the guide surface in comparison to the conventional apparatus requiring two-side precise machining, thereby lowering the machining costs as well as simplifying the structure of the table and allowing easy manufacturing of the apparatus.

In addition, when changing the magnetic force applied to generate the preload through control of the electric current applied to the electromagnetic coil, the floating gap of the static bearings can also be conveniently adjusted.

Figure 3:
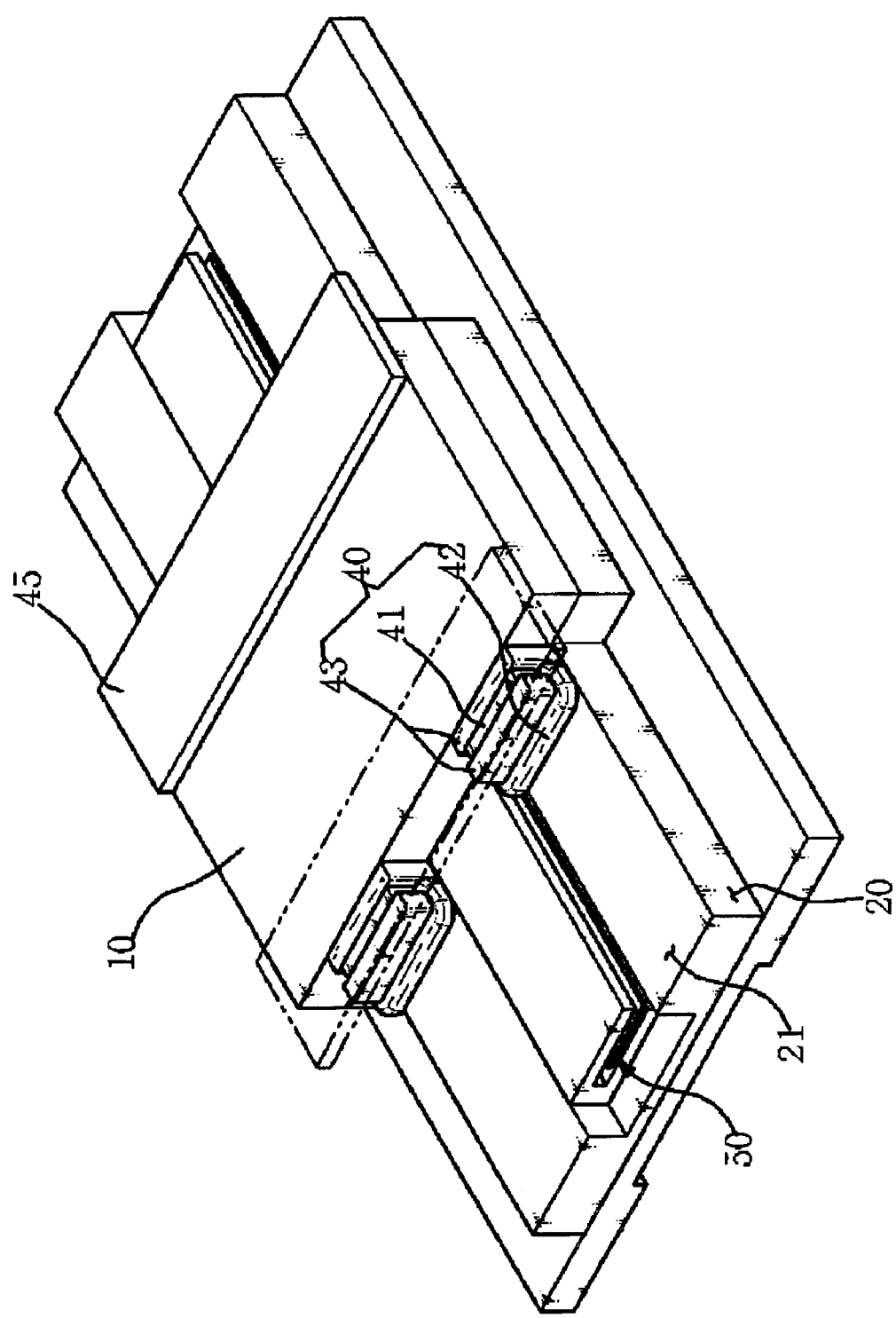
FIG. 3 is an exemplary view illustrating a single-axis guide which can be corrected in motional error by the single side pad type static bearing conveying apparatus according to the present invention.

FIG. 3 is an exemplary view illustrating the overall construction of a single-axis guide using the static bearing conveying apparatus having the magnetically preloading and motional error correcting functions according to the present invention, in which two magnetic preload units 40 are equipped to both sides of the guide 20, thereby enabling correction of errors in perpendicularly linear motion, in pitch motion and in rolling motion upon conveyance of the table.

Figure 4:
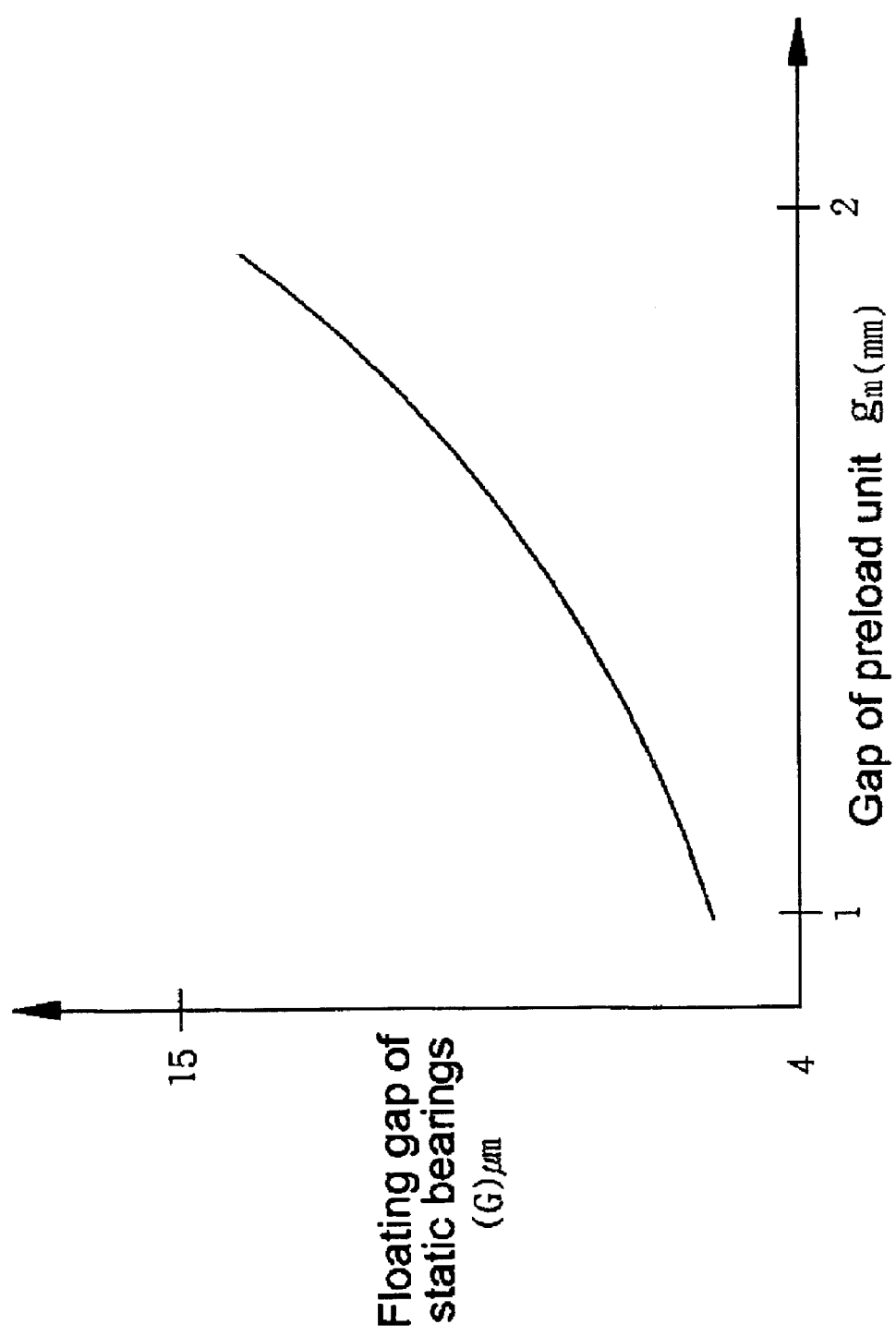
FIG. 4 is a graph depicting relationship between a floating gap of static bearings and a gap between a core and a guide of the static bearing conveying apparatus having the preloading and motional error correcting functions according to the present invention.
Figure 5:
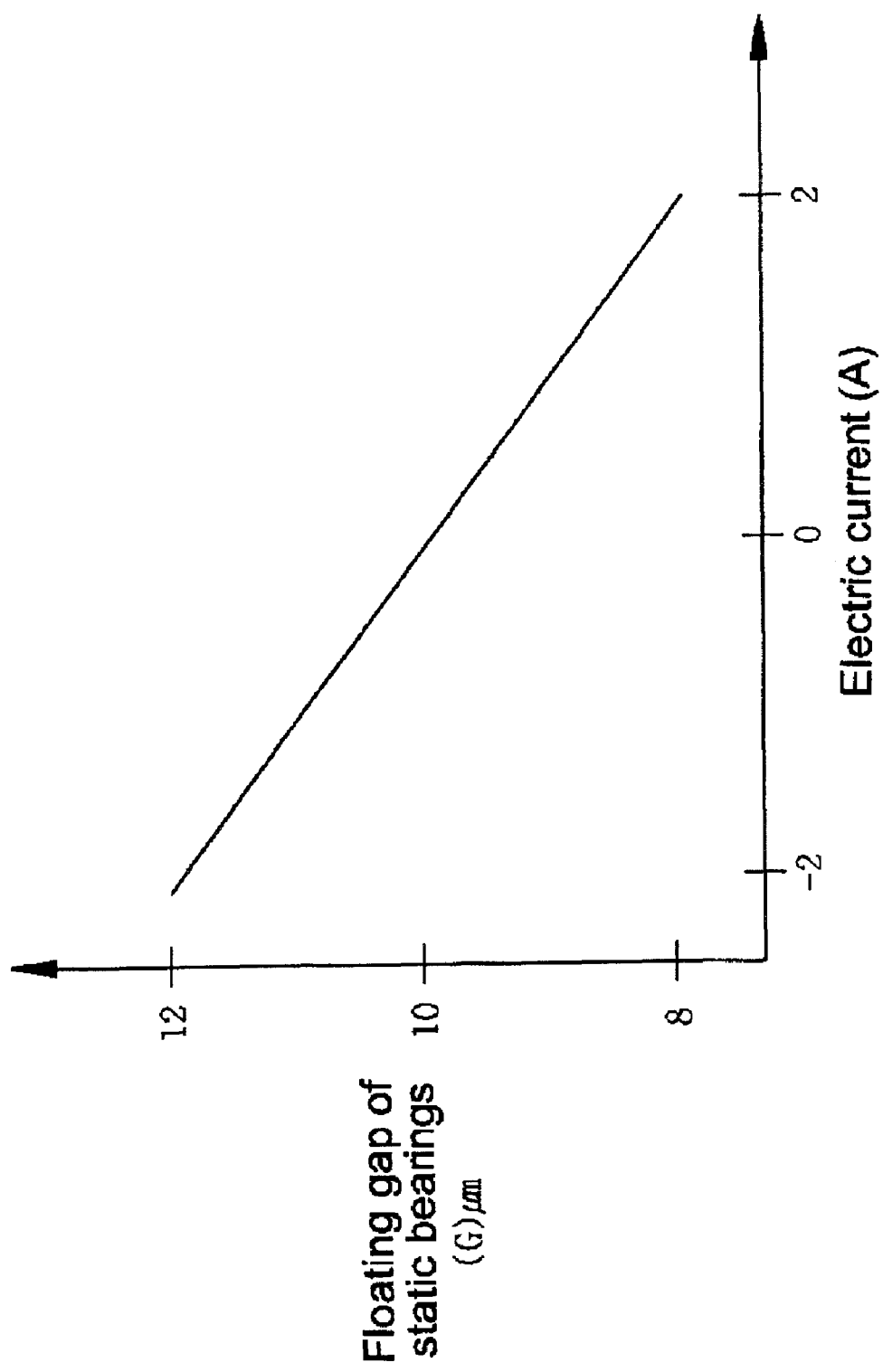
FIG. 5 is a graph depicting relationship between variation in a floating position of the static bearings and electric current of an electromagnetic coil.

FIG. 4 is a graph depicting relationship between the floating gap G (μm) of the static bearings and the gap gm (mm) of the magnetic preload unit for the guide in the static bearing conveying apparatus having the preloading and motional error correcting functions according to the present invention. FIG. 5 is a graph depicting relationship between variation in the floating gap G (μm) of the static bearings and electric current A of the electromagnetic coil. In FIG. 5, for example, when the floating gap G (μm) of the static bearings is 10 μm, the standard electric current A of the electromagnetic coil is set to 0 A. The floating gap of the static bearings is changed according to the electric current of the electromagnetic coil, and it can be appreciated from FIG. 5 that when the electric current of the electromagnetic coil has a positive value (+), the floating gap of the static bearings is decreased, and on the contrary, when the electric current of the electromagnetic coil has a negative value (−), the floating gap of the static bearings is increased.

As such, according to the present invention, since the number of guide surfaces requiring the precise machining is reduced to a half of the conventional apparatus due to simplification in structure of the table and the guide, there is an advantage of allowing easy manufacturing and thus reducing the manufacturing costs.

Moreover, the floating gap G of the static bearings can be adjusted by changing the magnetic force generating the preload through control of the electric current applied to the electromagnetic coil, which enables the guide surface to be used to correct the motional error caused by a geometrical error on the guide surface upon conveyance on the table.

In addition, according to the present invention, since the magnetic preload unit 40 employs the permanent magnet 41, an additional energy source is not required to generate magnetic force for a designed preload.

As apparent from the above description, according to the present invention, the static bearing conveying apparatus is a one-sided pad type apparatus which has a guide surface formed only on one side of a guide, and a pad fixed to a table to face the guide surface, thereby simplifying the structure of the table and the overall guide while reducing the volumes of the table and the overall guide.

In addition, the guide surface requiring precise machining is formed only on one side of the guide, thereby facilitating guide surface machining as well as reducing the machining costs thereof.

Moreover, the magnetic preload units in the apparatus apply magnetic force to the static bearings to generate preload on the static bearings through permanent magnets, and adjust a floating gap of the static bearings by adjusting the magnetic force using an electromagnetic coil, thereby reducing motional errors occurring upon conveyance on the table and remarkably enhancing precision of a conveying system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A static bearing conveying apparatus employing static bearings and having magnetic preloading and motional error correcting functions, the apparatus comprising:
 a guide including a guide surface formed on a side of the guide facing a table;
 a plurality of static bearing pads fixed to the table so as to face the guide surface;
 magnetic preload units provided on the table to generate a preload; and
 a motional error correcting control unit including a controller to control the magnetic preload units and a power amplifier to apply electric current according to a control signal from the controller, wherein
 the controller calculates the motional error of the conveying apparatus based on information about locations and errors of the conveying apparatus caused by machining errors on the guide surface,
 the magnetic preload units convert an additional correction signal that compensates the motional error into an associated electric current, the associated current being applied to an electromagnetic coil of each of the magnetic preload units, and
 the magnetic preload units correct a floating gap between the static bearing pads and the guide surface by changing a magnetic force of a permanent magnet of the magnetic preload units applied to generate the preload through a change of electrical current applied to the electromagnetic coil.

2. The apparatus according to claim 1, wherein each of the magnetic preload units includes the permanent magnet, a core collinear with magnetic fluxes from the permanent magnet, the electromagnetic coil wound around the core, and a fixing bracket having the permanent magnet supported by the table.

3. The apparatus according to claim 1, wherein the floating gap between the static bearing pads and the guide is maintained at 10 $\mu$m.

4. The apparatus according to claim 1, wherein the magnetic preload units are attached to respective sides of the table.

5. The apparatus according to claim 1, wherein the static bearing pads are disposed between respective magnetic preload units.

* * * * *